United States Patent [19]
Lehman

[11] 3,932,269
[45] Jan. 13, 1976

[54] HYDROGENATION OF HYDROCARBON RESIDUUM

[75] Inventor: Leon M. Lehman, Miami Beach, Fla.

[73] Assignee: Hydrocarbon Research, Inc., Morristown, N.J.

[22] Filed: July 14, 1972

[21] Appl. No.: 271,638

[52] U.S. Cl. ............... 208/157; 208/110; 208/111; 208/112; 252/417
[51] Int. Cl.² .................. B01J 37/14; C10G 13/02; C10G 13/14
[58] Field of Search ........................... 208/110, 157

[56] References Cited
UNITED STATES PATENTS

| | | | |
|---|---|---|---|
| 2,700,015 | 1/1955 | Joyce .................................. | 208/150 |
| 2,706,167 | 4/1955 | Harper et al. ...................... | 208/213 |
| 2,968,614 | 1/1961 | Brooks et al. ...................... | 208/264 |
| 3,207,688 | 9/1965 | Van Driesen ...................... | 208/59 |
| 3,410,791 | 11/1968 | Perry et al. ........................ | 208/143 |
| 3,410,792 | 11/1968 | Van Driesen et al. .............. | 208/143 |
| 3,523,888 | 8/1970 | Stewart et al. ...................... | 208/157 |
| 3,541,002 | 11/1970 | Rapp .................................. | 208/143 |
| 3,654,143 | 4/1972 | Kodera et al. ...................... | 208/146 |
| 3,725,247 | 4/1973 | Johnson et al. .................... | 208/111 |

*Primary Examiner*—Herbert Levine
*Assistant Examiner*—G. E. Schmitkons

[57] ABSTRACT

The operation of an ebullated-bed, liquid-phase hydrogenation process for the hydrocracking of a residuum hydrocarbon in the presence of a particulate catalyst is improved by operating under conditions such that there is a greater laydown of carbon on the catalyst than permitted in conventional operation of an ebullated-bed system which is followed by catalyst regeneration in the presence of steam and air and recycle of such regenerated catalyst to the reactor.

6 Claims, 1 Drawing Figure

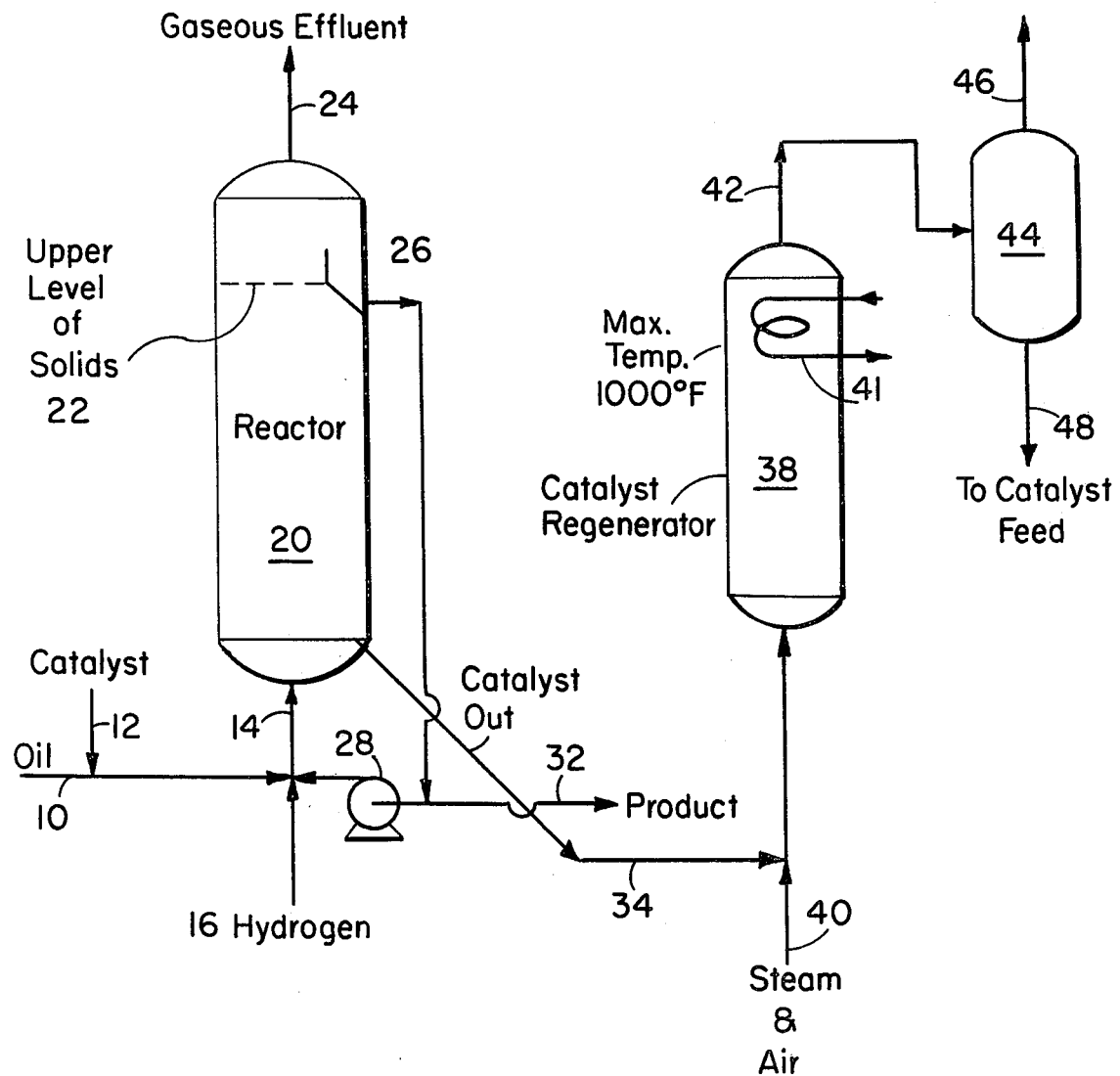

HYDROGENATION OF HYDROCARBON RESIDUUM

BACKGROUND OF THE INVENTION

U.S. Pat. No. Re. 25,770 disclosed an "ebullated" bed process for hydrogenation of residuum hydrocarbons to provide desulfurization or hydrocracking or both. As described therein, the reactants consisting of hydrogen and the residuum are under a controlled upflow velocity that places the particulate catalyst in the reactor in random motion in the liquid environment therein. The resulting contact between the residuum, hydrogen and catalyst results in superior conversion, substantially isothermal conditions, and with a minimum carryover of the catalyst from the reaction zone.

When hydrocracking residuum feed, the ebullated bed process is generally operated below 850°F to avoid excessive coking of catalyst. Such an operation requires reactors of a size sufficient to hold the oil for an average time in the order of one hour to achieve substantial conversion. The carbon lay-down on the catalyst has been limited to a negligible amount, say, less than 0.01 percent of the feed. It has been considered important to maintain this limit, as excessive carbon deposited on the catalyst reduces its activity and requires that the catalyst be withdrawn from the reactor and replaced with new catalyst. Failure to maintain a proper level of catalyst activity will result in unstable reaction products which will ultimately render the process inoperable. One of the great advantages of the ebullated bed process is that it makes possible the addition and replacement of this catalyst. However, a significant cost of operating this process for the hydrocracking of hydrocarbons residuum is the replacement cost of the catalyst.

SUMMARY OF THE INVENTION

I have determined that substantial improvements can be made in the cost of operations if withdrawn catalyst is regenerated by controlled combustion of carbon lay-down. This will permit operations to take place at more severe conditions of carbon lay-down, but without the penalty of having to pay for fresh catalyst addition.

It should be noted that by increasing the reactor temperature by approximately 20°F, the required residence time of the oil in the reactor decreases by a factor of two. What has hindered the use of higher temperatures and lower residence times is the fact that the rate of coking increases by a far greater rate than the rate of hydrocracking. Consequently, substantially more coke will be deposited in a process operating at, say 900°F, than in a process operating at 850°F and producing the same conversion. The coke produced by the far larger reactor needed for the residence time requirement at the lower temperature, 850°F, will be far less than at the higher temperature. However, if the catalyst is withdrawn and coke removed, then this problem of increased coke lay-down does not result in severe penalty of providing fresh catalyst addition. Consequently use of smaller reactors at higher temperatures becomes feasible.

An alternate use of this scheme would be to lower the pressure requirements of this process. To operate a process to hydrocrack residuum, say, at the level of converting 75 percent of the residuum boiling above 975°F to material boiling below 975°F, requires high pressure, generally in excess of 2000 psig, to avoid excessive deposition of carbon on the catalyst. By my invention it will be possible to lower the pressure required to say, between 300 to 1000 psig. This will result in a marked reduction of cost of equipment and power necessary to bring the feed and make-up hydrogen to reactor conditions.

A third application of my invention would be to hold the reactor conditions of residence time, temperature and pressure as in conventional operation. My invention would then be employed to obtain conversions in excess of those obtained by conventional operation.

DESCRIPTION OF THE DRAWING

The drawing is a schematic arrangement of the apparatus for carrying out the invention.

DESCRIPTION OF THE PREFERRED EMBODIMENT

Under conventional processing, a residuum oil feed 10, appropriately heated to a reaction temperature of between 820°F and 850°F, together with a particulate hydrogenation catalyst at 12 is introduced at 14 with hydrogen at 16 to reactor 20. Reactor 20 is operated at a partial pressure between 2000 and 3000 psi of hydrogen. Under the conditions of this reactor 75 percent of the material boiling over 975°F is converted to material boiling below 975°F.

Utilizing the concept of the present invention, reactor 20 can be operated between 900°–950°F at partial pressures between 2000 and 3000 psi of hydrogen. Alternatively reactor 20 can be maintained at between 820°F and 850°F and its partial pressure dropped to 400–800 psi of hydrogen.

This reactor is substantially vertical with the total upflow liquid velocity at a rate of from 5 to 120 gallons per minute per square foot of reactor cross section and with a catalyst of a close average size in the overall range of ¼ inch to 200 mesh (Tyler). The hydrocracking catalyst is selected from the group consisting of cobalt, molybdenum and mixtures thereof on a carrier selected from the group consisting of alumina, silica and mixtures thereof. A bed expansion is accomplished in excess of 10 percent based on the settled bed volume but not to exceed about 200 percent and below an expansion that would carry catalyst out of the bed. An interface between a dense catalyst concentration and a very dilute catalyst concentration at the upper level of solids is shown at 22. Gaseous effluent is removed at 24 and the liquid effluent is removed at 26.

To maintain the desired upward liquid velocity a part of the liquid in line 26 may be pumped at 28 back to the bottom of the reactor 20. The net product is removed at 32. The space velocity, which is inversely proportional to the residence time of the oil in the reactor, in volume of liquid feed measured at 60°F per hour per volume of reactor ($V_f/hr/V_r$) is between 3.0 and 10.0 $V_f/hr/V_r$ at high temperature hydrocracking conditions or between 0.5 and 1.5 $V_f/hr/V_r$ at low pressure hydrocracking conditions.

In the ebullated bed hydrocracking system, the catalyst life is expressed as barrels of residuum oil feed per pound of catalyst and under these conditions of severe carbon laydown, this is generally between 5 and 20 Bbl/lb. The catalyst is replaced at such a rate by withdrawing aged catalyst at 34 and replacing it at 12. In an ebullated bed hydrocracking system wherein there is substantial backmixing, catalyst is actually withdrawn continuously at a predetermined rate, i.e. continuously removing catalyst from the reaction zone at a rate at least twice as great as the rate of addition of fresh catalyst. Under the prior art, the catalyst is then discarded because of the deactivation due to carbon laydown and to metals laydown.

In accordance with my invention, I operate the residuum hydrocracking process at much higher carbon laydown operating conditions. I then proceed to maintain the net removal of catalyst at such that between 5 and 20 bbl. of oil are processed per pound of fresh catalyst. However, the oil processed per pound of carbon-free catalyst added to the reactor, both fresh and regenerated catalyst, is reduced to between 0.5 and 3 Bbl/lb.

It will be appreciated that by increasing the hydrocracking temperature, for example, in the order of 100°F. the reaction rate increased in the order of eight times and hence the reactor can be of an order of magnitude smaller than normal sizes.

While I have shown and described a preferred form of embodiment of my invention, I am aware that modifications may be made thereto within the scope and spirit of the description herein and claims appended hereto. It is particularly appreciated that the catalyst regeneration scheme shown may be modified to involve a more complex procedure of stripping oil from catalyst, washing, etc., prior to burning.

I claim:

1. In the process for the hydrocracking of a residuum oil in an ebullated bed reactor to convert at least 50 weight percent of the hydrocarbons boiling above 975°F in a reaction zone at a pressure between about 300 and 1000 psi of hydrogen when a temperature between about 750° and 850°F is used and at a pressure between about 1000–3000 psi when a temperature between about 900° and 950° is used by contacting said oil with a hydrocracking catalyst wherein coke deposits on the catalyst to reduce its activity and fresh catalyst is added to maintain a desired average catalyst activity at a rate such that between 5 and 20 barrels of oil are processed per pound of fresh catalyst and wherein the oil and hydrogen pass upwardly through the reaction zone under conditions to maintain the catalyst in random motion with substantial carryover of catalyst with liquid effluent from the reaction zone, the improvement comprising:

a. continuously removing said catalyst from said reaction zone at a rate at least twice as great as the rate of addition of fresh catalyst;
   b. regenerating said catalyst to remove deposited carbon; and
   c. recycling an appropriate portion of the regenerated catalyst to said reactor at a rate supplementing the rate of addition of fresh catalyst so as to maintain the desired inventory of total catalyst in the reactor and processing between 0.5 and 3.0 bbl/lb of carbon-free catalyst, both fresh and regenerated added to the reactor.

2. The process of claim 1 wherein the partial pressure of hydrogen is in the range of 300 and 1000 psi with the reactor operating in the temperature range between 750°F–850°F.

3. The process of claim 2 wherein the catalyst is selected from the group consisting of cobalt, molybdenum and mixtures thereof on a carrier selected from the group consisting of alumina, silica and mixtures thereof.

4. The process of claim 1 wherein the temperature in the reaction zone is in the range of 900° to 950°F and the partial pressure of the hydrogen is in the range of 1000 to 3000 psi.

5. The process of claim 1 wherein the temperature in the reaction zone is in the range of 820°–850°F and the partial pressure of the hydrogen is in the range of 2000 to 3000 psi and the conversion of material boiling above 975°F to material boiling below 975°F is in the order of 90 weight percent.

6. The process of claim 1 wherein the catalyst is selected from the group consisting of cobalt, molybdenum and mixtures thereof on a carrier selected from the group consisting of alumina, silica and mixtures thereof.

* * * * *